(12) United States Patent
Lapidous et al.

(10) Patent No.: US 9,942,204 B2
(45) Date of Patent: Apr. 10, 2018

(54) SECURE PERSONAL SERVER SYSTEM AND METHOD

(71) Applicant: AnchorFree Inc., Mountain View, CA (US)

(72) Inventors: Eugene Lapidous, Saratoga, CA (US); Artem Arsitov, Sunnyvale, CA (US); Vamsi Krishha Ambati, Fremont, CA (US); Maxim Molchanov, Mountain View, CA (US)

(73) Assignee: ANCHORFREE INC., Redwood City, CA (US)

( * ) Notice: Subject to any disclaimer, the term of this patent is extended or adjusted under 35 U.S.C. 154(b) by 226 days.

(21) Appl. No.: 14/676,601

(22) Filed: Apr. 1, 2015

(65) Prior Publication Data

US 2016/0197886 A1    Jul. 7, 2016

Related U.S. Application Data

(60) Provisional application No. 62/100,788, filed on Jan. 7, 2015.

(51) Int. Cl.
*H04L 29/06* (2006.01)
*H04L 29/08* (2006.01)
(Continued)

(52) U.S. Cl.
CPC ...... *H04L 63/0428* (2013.01); *H04L 12/4641* (2013.01); *H04L 29/06965* (2013.01);
(Continued)

(58) Field of Classification Search
None
See application file for complete search history.

(56) References Cited

U.S. PATENT DOCUMENTS 6,950,936 B2 * 9/2005 Subramaniam ...... G06Q 20/382
705/64
8,566,452 B1 * 10/2013 Goodwin, III ...... H04L 63/0281
709/227
(Continued)

OTHER PUBLICATIONS

Mink, Stefan; Pahlke, Frank; Schafer, Gunter; Schiller, Jochen. Towards Secure Mobility Support for IP Networks. International Conference on Communication Technology. WCC-ICCT 2000. Pub. Date: 2000. http://ieeexplore.ieee.org/stamp/stamp.jsp?arnumber=889265.*

(Continued)

*Primary Examiner* — Jeremiah Avery
(74) *Attorney, Agent, or Firm* — David R. Stevens; Stevens Law Group

(57) ABSTRACT

A provider computer announces content to the provider computer and establishes a secure connection to a VPN server. Requests for the content are received in one protocol (HTTPS) from the consumer computer and forwarded to the VPN server in a less secure protocol (HTTP) by a protocol conversion proxy, which then forwards the request to the provider computer. A public URL and secure URL may be associated with the same content. The public URL is announced to a consumer computer. A public server receives the public URL and returns the secure URL, which consumer computer uses to establish a secure connection to the provider computer. Upon the secure URL being compromised, a new secure URL is associated with the public URL. The source IP addresses of requests for the public and secure URLs may be compared to determine whether the secure URL is compromised.

10 Claims, 12 Drawing Sheets

(51) Int. Cl.
  *H04L 12/26* (2006.01)
  *H04L 12/46* (2006.01)
(52) U.S. Cl.
  CPC .......... *H04L 43/16* (2013.01); *H04L 63/0272* (2013.01); *H04L 63/0281* (2013.01); *H04L 63/04* (2013.01); *H04L 63/0471* (2013.01); *H04L 63/0823* (2013.01); *H04L 63/10* (2013.01); *H04L 63/102* (2013.01); *H04L 67/02* (2013.01); *H04L 69/08* (2013.01); H04L 63/168 (2013.01)

(56) References Cited

U.S. PATENT DOCUMENTS

| | | | |
|---|---|---|---|
| 2003/0229718 | A1 | 12/2003 | Tock et al. |
| 2006/0143703 | A1* | 6/2006 | Hopen ................ G06F 21/6218 726/15 |
| 2006/0236124 | A1* | 10/2006 | Polozoff ............ H04L 63/0428 713/189 |
| 2008/0155067 | A1 | 6/2008 | Rivera et al. |
| 2008/0262994 | A1 | 10/2008 | Berry et al. |
| 2010/0299517 | A1* | 11/2010 | Jukic ................... H04L 12/2809 713/150 |
| 2012/0022941 | A1 | 1/2012 | Gorodyansky |
| 2013/0212227 | A1* | 8/2013 | Thomas .................. H04L 67/02 709/219 |
| 2014/0201528 | A1* | 7/2014 | Krig ........................ H04L 67/22 713/168 |
| 2014/0244406 | A1 | 8/2014 | Garcia-Martinez et al. |
| 2015/0319174 | A1* | 11/2015 | Hayton .................. H04L 63/10 726/7 |
| 2016/0344745 | A1* | 11/2016 | Johnson ................ H04L 67/34 |

OTHER PUBLICATIONS

Ishaq, Isam; Hoebeke, Jeroen; Moerman, Ingrid; Demmester, Piet. Internet of Things Virtual Networks: Bringing Network Virtualization to Resource-constrained Devices. 2012 IEEE International Conference on Green Computing and Communications (GreenCom). http://ieeexplore.ieee.org/stamp/stamp.jsp?arnumber=6468329.*

* cited by examiner

500

600

SECURE PERSONAL SERVER SYSTEM AND METHOD

RELATED APPLICATIONS

This application claims the benefit of U.S. Provisional Application Ser. No. 62/100,788, filed Jan. 7, 2015 and entitled Secure Personal Server. This application is also related to U.S. application Ser. No. 14/676,625 filed Apr. 1, 2015 and U.S. application Ser. No. 14/676,648 filed Apr. 1, 2015. The applications are incorporated herein by reference for all purposes.

BACKGROUND

Internet users generate large amounts of content, such as images, video and audio files. Users can share selected files by sending messages to friends, or by posting to known web sites, such as social networks, image or video galleries.

However, the amount of the content generated by many users is too large for distribution through these channels. Uploading all this content to the online storage servers is often costly or impractical. For instance, security videos generated by web cameras could consume large amount of storage, with only small portions of these videos being used for detailed reviews. Large collections of personal images may have relatively few pictures repeatedly viewed at high resolution, etc. Another problem with uploading the content to the online storage is a potential breach of privacy and disclosure of sensitive content.

These problems could be resolved if user-generated content, stored on a personal computer, is made available for remote access by installing a local web server addressable by a public domain name. However, many personal computers are located behind the routers that use Network Address Translation (NAT). Such routers usually don't allow external access to their local networks; custom configuration changes to relax these restrictions, such as port forwarding, may decrease security of computers on the local network, exposing them to outside threats such as denial of service attacks, extensive port scanning and exploits of known vulnerabilities.

It is possible to bypass router restrictions on external access without custom configuration changes, by establishing communication channel with an intermediary server capable of supporting reverse connections. After initial connection is established between the personal computer and the intermediary server, that server can forward request from remote client through a reverse connection to the personal computer and forward the response from the personal content server back to the remote client. One such implementation was done by the Opera Software ASA corporation under the name Opera Unite™. This implementation enables remote client to view user's content without installing additional software: any standard web browser can open the web page served by the personal HTTP server through the reverse connection.

One of the problems of such implementation is unsecure data exchange between personal computer and remote client. Even if channel used for reverse communications is encrypted (for instance, a reverse SSH tunnel), this encryption doesn't protect the traffic between the content consumer and an intermediary server. Unauthorized third party can observe or modify that traffic, or even pose as content provider by redirecting DNS requests to its own IP address and responding to requested links.

End-to-end data security (for instance, by using HTTPS protocol between the personal content server and remote client) would require storing private SSL certificates on personal computers, which could be costly and hard to protect from unauthorized disclosure.

Therefore, there is a need to enable secure sharing of user's content with remote clients without first uploading it to remote servers, performing unsecure modifications of router configurations or requiring remote clients to install additional software.

SUMMARY OF THE INVENTION

In one aspect of the invention, a method for providing access to content on a first computer includes:
1. establishing, by a server system, an encrypted connection with the first computer, the connection server being enabled to provide reverse connections to the first computer;
2. receiving, by the server system, from a second computer a request for the content on the first computer, the request being performed using a first type of communication protocol; and
3. converting, by the server system, using a protocol conversion module the request for the content to a translated request having a second type of communication protocol, where the first type of communication protocol at least partially encrypts exchanged data using an encryption key available to the protocol conversion module whereas the second type of communication protocol does not encrypt at least some parts of the translated request for which corresponding parts of the request for content are encrypted by the first type of communication protocol.

In some implementations, transmitting the translated request to the first computer is performed only in response to determining that a number of simultaneous connections to the first computer are less than a threshold.

In some implementations, the first type of communication protocol is hypertext transfer protocol secure (HTTPS) and the second type of communication protocol is hyper text transfer protocol (HTTP). The encrypted connection may be a transport-level tunnel and the protocol conversion module may be an HTTPS-to-HTTP proxy.

In some embodiments, the method may include reporting, by the server system, availability of the content on the first computer to a routing module; receiving, by the routing module, reports of availability of content on a plurality of different computers from a plurality of intermediary servers; receiving, by the routing module, the request for the content on the first computer from the second computer; and routing, by the routing module, the request for the content on the first computer to the server system.

The server system and routing module may be in the same local network. The server system may include a VPN server and a protocol conversion server, the VPN server performing establishing the encrypted connection with the first computer and the protocol conversion server implementing the protocol conversion module, the VPN server and protocol conversion server are in the same local computer. In some embodiments, the at least one intermediary server of the plurality of intermediary servers is in a different local network than the same local network.

1. In another aspect of the invention, a method for providing access to content on a personal computer includes:

2. receiving, by a server system from the personal computer, a posting message, the posting message including a posting uniform resource locator (URL) and referencing content on the personal computer;
3. receiving, by the server system, a request message from a requesting computer, the request message including the posting URL and having hyper text transfer protocol secure (HTTPS) request formatting;
4. establishing, by the server system, a virtual private network (VPN) tunnel to the personal computer;
5. translating, by the server system, the request message to a translated message including the posting URL and having hyper text transfer protocol (HTTP) request formatting; and
6. transmitting, by the server system, the translated message to the personal computer within the VPN tunnel.

In some implementations, the method further includes:
1. receiving, by the server system, a response to the translated message from the personal computer, the response having HTTP response formatting;
2. translating, by the server system, the response to a translated response having HTTPS response formatting; and
3. transmitting, by the server system, the translated response to the requesting computer.

In some implementations, the server system comprises a protocol conversion proxy computer and a VPN server computer each located within a local network. Translating the request message to the translated message may be performed by the protocol conversion proxy (PCP) computer. Establishing the VPN tunnel to the personal computer may be performed by the VPN server computer. The method may further include transmitting the translated message to the VPN server computer by the PCP and forwarding the translated message to the personal computer by the VPN server through the VPN tunnel.

In some implementations, translating the response to the translated response is performed by the PCP computer. The method may further include forwarding the response to the PCP computer by the VPN server computer and transmitting the translated response by the PCP computer to the requesting computer.

In some implementations, the method further includes reporting, by the server system, the posting URL to a routing module; receiving, by the routing module from a plurality of intermediary servers, other URLs referencing content on a plurality of other computers; receiving, by the routing module, the request request message; and routing, by the routing module, the request message to the server system.

In some embodiments, the server system and routing module are in the same local network.

In another aspect of the invention, a computer-readable medium includes a non-transitory storage device and storing executable code effective instruct one or more processors to:
1. receive an instruction to make content available to a recipient computer system;
2. in response to the instruction to make the content available to a recipient computer system, transmit an invitation to access the content to the recipient computer system;
3. establish an encrypted virtual private network (VPN) connection to an intermediary server system;
4. receive one or more requests for the content; and
5. for each request of the one or more requests—only if the each request is both of received from the intermediary server and through the encrypted VPN connection, transmitting the content to the intermediary server over the encrypted VPN connection; and if the each request is not both of received from the intermediary server and through the encrypted VPN connection, refraining from transmitting the content to the intermediary server over the encrypted VPN connection.

In some implementations, the executable code includes instruction for instructing the one or more processors to transmit the invitation to access the content to the recipient computer system in at least one of a text message, email, message, and posting to a web site. The invitation to access the content includes a domain name referencing a computer hosing the processor. The executable code may be further effective to instruct the one or more processors to transmit the invitation to access the content to the recipient computer system in bypass of the intermediary server.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
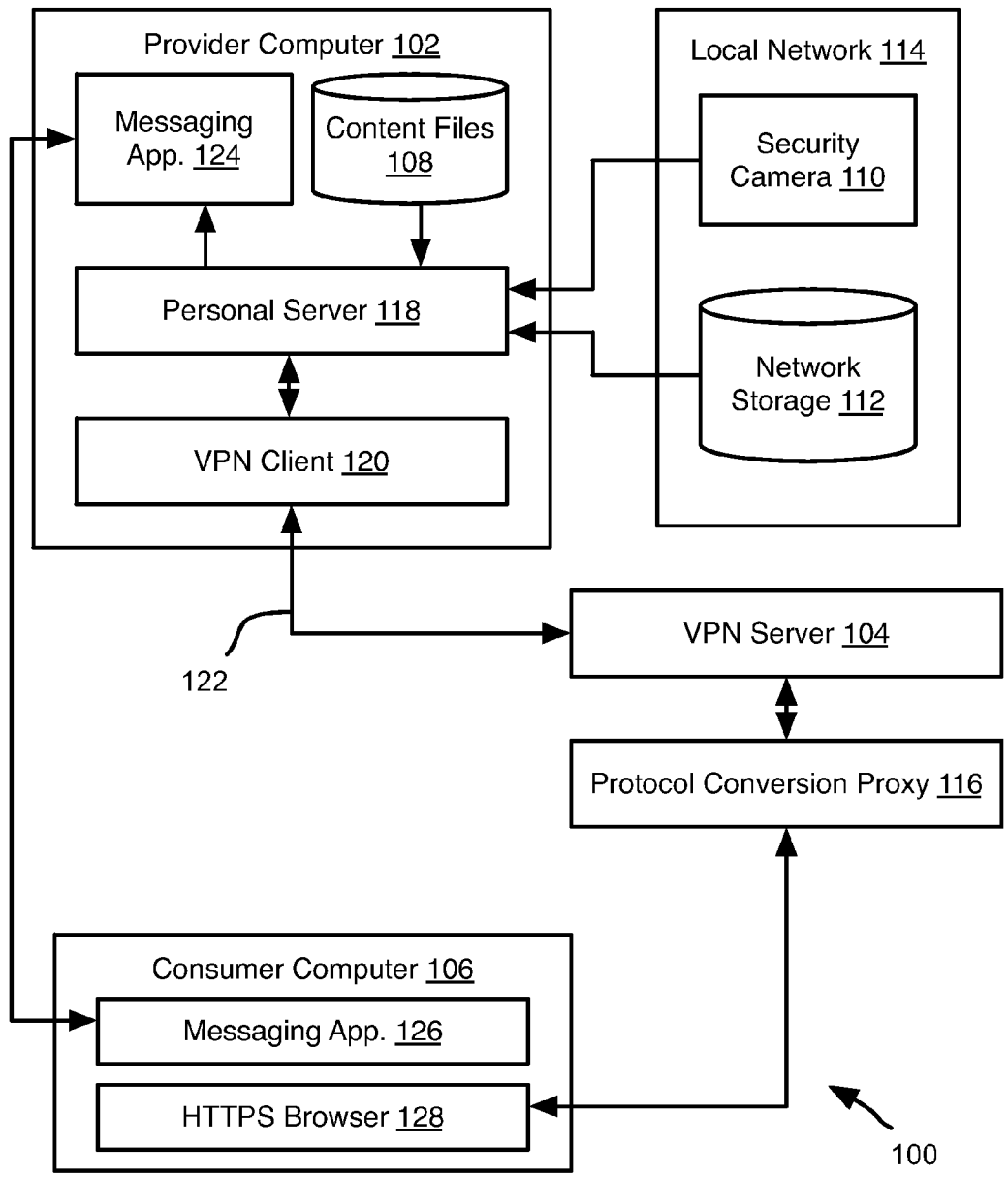
FIG. 1 is a diagram of a first network environment for sharing content from a provider's personal computer in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In one aspect of the invention, a first computer establishes an encrypted connection with a connection server enabled to provide reverse connections. A second computer issues request for the content available from the first computer while using communication protocol of a first type. A protocol conversion module receives this request, converting it to communication protocol of a second type and forwarding it to a first computer through the encrypted reverse connection provided by the connection server. The communication protocol of the first type at least partially encrypts exchanged data using the encryption key available to the protocol conversion module, while communication protocol of the second type does not encrypt at least some parts of the data encrypted by the protocol of the first type.

In one implementation, the first computer serves requested content only if one or more conditions are met, one of the conditions being that request is submitted through encrypted reverse connection from the connection server.

In some implementations, a content request is sent to the first computer only if one or more conditions are met, one of more of these conditions being provided by the first computer before second computer issues a content request. One example of preset condition is that number of simultaneous connections to the first computer doesn't exceed a threshold value.

In some instances, the first computer announces content availability to a second computer in bypass of the protocol conversion module before second computer issues a content request. In one example, this announcement comprises sending a link to the announced content through email, text message, instant message or a post to a web site accessible from the second computer.

In one implementation, the protocol of the first type is HTTPS, while the protocol of the second type is HTTP. The encrypted connection is a transport-level tunnel and the connection server is a VPN server. In such implementations, the protocol conversion module is an HTTPS-to-HTTP proxy.

In one embodiment, a plurality of the first computers are connected to different intermediary servers through encrypted connections. Before a second computer issues a content request, at least one intermediary server reports accessibility of the first computer associated with a content reference to a routing module. The routing module receives content request associated with that content reference and routes it to the corresponding intermediary server.

In one instance, the protocol conversion module and routing module are connected to the same local network, while at least one of the intermediary servers is connected to a different local network.

In one other embodiment, a plurality of content items are available from plurality of first computers are associated with a plurality of domain names containing identifiers of corresponding first computers. The content items from at least two different first computers are accessible by issuing requests to different IP (internet protocol) addresses. The second computer obtains the domain name referencing the first computer providing the requested content item and issues a request to a domain name server to resolve that domain. The domain name server obtains information about a plurality of IP addresses associated with different domains and returns an IP address associated with requested domain.

In one instance, a plurality of IP addresses point to plurality of protocol conversion modules, each of these modules forwarding the content request to a connection server that maintains encrypted connection with a first computer providing requested content. In one example, the protocol conversion module resides on the same local network as connection server, thereby protecting the data exchange from external observation. In one implementation, the protocol conversion module and connection server reside on the same node of the local network, associated with the same physical computer hardware.

In another aspect of the present invention, a first computer establishes connection with a connection server enabled to provide reverse connections. A second computer issues a request containing a reference to the content provided by a third computer. The second computer receives a response containing a reference to the content provided by the first computer and then requests this content through the reverse connection to the first computer, where the data exchange between the first and the second computers is encrypted using a key known to the first second computer.

In one implementation, reference to the content provided to the first computer contains a domain name associated with encryption key known to the first computer and, upon detecting increased risk that encryption key could be compromised, the domain and associated encryption key are replaced without changing the reference to the content available from the third computer.

In one instance, the first computer announces content availability to a second computer by providing a reference to the content available from the third computer, before the second computer issues a content request. In one example, this announcement comprises sending a link to the announced content through email, text message, instant message or a post to a web site accessible from the second computer.

In one implementation, connection server is a VPN server. In another implementation, connection server is a proxy server. In another implementation, connection server is an SSH server.

In one embodiment, data exchange between the first and the second computers is encrypted using HTTPS protocol, and the first computer hosts an HTTPS server having access to a private SSL certificate for the HTTPS data exchange between the first and second computers.

In one implementation, data exchange between the second and the third computer uses the protocol different from the one used for the data exchange between the second and the first computers.

In one instance, data exchange between the first and the second computers is encrypted using VPN protocol, and the first computer contains VPN server.

In one embodiment, data exchange between the first and the third computer is encrypted using the key known to the third computer. In one instance, data exchange between the first and the third computer is encrypted using HTTPS protocol and the third computer hosts an HTTPS server.

In one other embodiment, data exchange between the first and the third computer uses HTTP protocol. In one example, the third computer is the same as the first computer.

In one embodiment, the response from the second computer is an HTML document containing HTML element with a source referencing the content provided by the third computer. In one implementation, the HTML element is selected from the group of an image, a video and an IFrame.

In another embodiment, the response from the second computer is a redirection to the URL referencing the content provided by the third computer.

In another aspect of the present invention, the first computer requests content from the second computer, receives a response containing a reference to the content available from the third computer, establishes an encrypted connection to the third computer, and requests the content over this connection. The source IP addresses of the requests to the second and the third computer are compared and the risk that one of the encrypted connections established by the first computer is compromised is increased if these IP addresses don't match.

In one instance, third computer establishes connection with a connection server enabled to provide reverse connection, and content request from the first computer to the third computer is sent through the connection server, while content request from the first computer to the second computer is sent in bypass of the connection server.

In one implementation, the connection between the first and the second computers uses different encryption keys than the connection between the first and the third computers.

In one embodiment, one of the two encrypted communication channels established by the first computer has lower risk of compromising its encryption than another channel, and detection that source IP addresses of the two requests don't match increases the probability that encryption channel with the higher security risk is compromised. In one instance, the encrypted connection between the first and the third computer has higher risk of being compromised than the connection between the first and the second computer.

In one implementation, the risk that the encrypted connection between the first and the third computers is increased if the request for the content referenced in the response from the second server doesn't arrive within a pre-defined time interval, for instance less than 10 seconds.

In one instance, the reference to content available from the third computer is returned only if one or more conditions are met, otherwise a response is returned without the reference to that content. In another instance, reference to content available from the third computer is returned but made visible to the user only if one or more conditions are met.

In one implementation, the reference to the content available from the first computer is returned and that content is made visible only if at least one of the predefined conditions are met, including ones from the group of the content from the third computer being accessible less than a pre-defined time ago, the number of requests for that content didn't exceed the pre-defined count and the risk that encrypted connection with the third server remains low.

In one embodiment, the response from the second computer is an HTML document containing an HTML element with a source referencing the content provided by the third computer. That HTML element has at least one attribute controlling its visibility. In one implementation, this HTML element is selected from the group of an image, a video and an IFrame.

In another embodiment, response from the second computer is a redirection to the URL referencing the content provided by the third computer.

In one instance, detection that IP addresses do not match increases security risk for subsequent requests from at least one of these source IP addresses for the pre-defined time.

In one other instance, the risk that the encrypted connection with the third server is compromised is increased by a larger amount if the same source IP for the request to the content from the third server is observed after at least two requests for the content from the second server, said two requests having different source IPs.

In one embodiment, one or more first computers issue requests to the same second computer, each first computer receiving a response containing plurality of references to content available from plurality of third computers. The one or more first computers establish a plurality of encrypted connections to the referenced third computers and request a content over these connections.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider). Computer networks may use transport protocols other than Internet Protocol. Correspondingly, present invention could be implemented for types of network addresses other than IP addresses.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates an example network architecture 100 in which the methods disclosed herein may be implemented. In one aspect of the present invention, provider computer 102 establishes an encrypted connection with a connection server, such as the illustrated virtual private network (VPN) server 104 enabled to provide reverse connections. A consumer computer 106 issues a request for content available from the first computer, such as content files 108 stored on the personal computer 102, video or images from a security camera 110, or files from network storage 112. The security camera 114 and network storage may be coupled to the provider computer 102 by a local network 114, e.g. LAN or some other type of network.

The consumer computer 106 may issue requests using a communication protocol of a first type. A protocol conversion proxy 116 receives this request, converting it to a communication protocol of a second type and forwarding it the provider computer 102 through the encrypted reverse connection provided by the VPN server 104. The communication protocol of the first type at least partially encrypts exchanged data using an encryption key available to the protocol conversion proxy 116, while communication protocol of the second type does not encrypt at least some parts of the data encrypted by the protocol of the first type.

In the embodiment depicted in FIG. 1, the protocol of the first type is HTTPS (hypertext transfer protocol secure), while protocol of the second type is HTTP (hyper text transfer protocol). The encrypted connection between provider computer 102 and the VPN server 104 may be a transport-level tunnel. The protocol conversion proxy 116 may be embodied as an HTTPS-to-HTTP proxy.

Further referring to FIG. 1, the provider computer 102 may be a personal computer hosting a personal server 118 enabled to serve local content files as well as data from the local network 114, for instance, from network attached storage 112 or security camera 110.

The provider computer 102 hosts a VPN client 120 that establishes the encrypted VPN tunnel 122 with VPN server 104, which provides reverse connection to the personal server 118 through the VPN tunnel 122.

In one implementation, provider computer 102 announces content availability to the consumer computer 106 in bypass of the protocol conversion proxy 116. In the depicted embodiment, it sends a message with an HTTPS URL from provider's messaging application 124 to a corresponding messaging application 126 hosted by the consumer computer 106. The messaging application may be any messaging application known in the art such as email, text message (SMS, MMS, iMessage™, etc.), instant messenger, messages within a social media platform (Twitter™, Facebook, LinkedIn™, etc.). The HTTPS URL may be communicated to the consumer computer 106 by the provider computer 102 by posting it to a known online location or using other communication methods known in the art. Bypassing the protocol conversion proxy 116 allows for exchanging of additional information, such as a hash tag of the HTTPS URL that could be used for additional encryption with the knowledge of protocol conversion proxy 116.

An HTTPS browser 128 on the consumer computer 106 may issue a HTTPS request for the HTTPS URL received from the provider computer 102. This request is received by protocol conversion proxy 116, which uses a private SSL (secure socket layer) certificate to decrypt received data and then send an HTTP request to the personal server 118 of the provider computer 102 through the reverse connection provided by VPN server 104. After receiving an HTTP response from the personal server 118, the protocol conversion proxy 116 transforms it into an HTTPS response, and sends it back to the HTTPS browser 128 of the consumer computer 106.

As a result, data exchange between provider computer 102 and consumer computer 106 is protected by the strong encryption (in one part of the data path, by HTTPS; in another part, by VPN tunnel 122) without the need for the provider computer 102 to store an encryption key (e.g., a private SSL key), whose disclosure would compromise communication security. Instead, the private SSL key, e.g. a key used to secure HTTPS communication between HTTPS browser and protocol conversion proxy 116, is stored outside of the personal server 118 at a location that can be better protected from security breaches.

In other implementations, the VPN server 104 may additionally or alternatively include a proxy or an application-level tunnel server (such as a SSH server), capable of providing reverse connection through an encrypted channel.

Likewise, the protocol of the first type could be any encrypted communication protocol between the consumer computer 106 and protocol conversion proxy 116, provided the consumer computer 106 hosts a client and protocol conversion proxy 116 hosts a server for such a protocol. For instance, it could be a VPN tunnel (protocol conversion proxy 116 would host a VPN server and consumer computer 106 a VPN client), encrypted WebRTC (Web Real Time Communication) (protocol conversion proxy 116 would host a WebRTC module and consumer computer 106 would host a WebRTC client), or secure messaging protocol (protocol conversion proxy 116 would include a secure messaging server and consumer computer 106 would include a secure messaging client). In each of these implementations, the protocol of the second type could be any protocol that provides data exchange without the need for the provider computer 102 to have access to sensitive encryption keys, such as unsecure FTP or any type of unprotected messaging.

In one implementation, provider computer 102 provides content only if one or more preset conditions are met, one of the conditions being that the request is submitted through encrypted reverse connection to the VPN server 104. Ensuring that only content requests coming through the encrypted connection with VPN server 104 allows taking advantage of additional access control measures, applied before content request reaches the client's computer; these access control measures are discussed below in reference to FIGS. 3 and 4.

Figure 2:
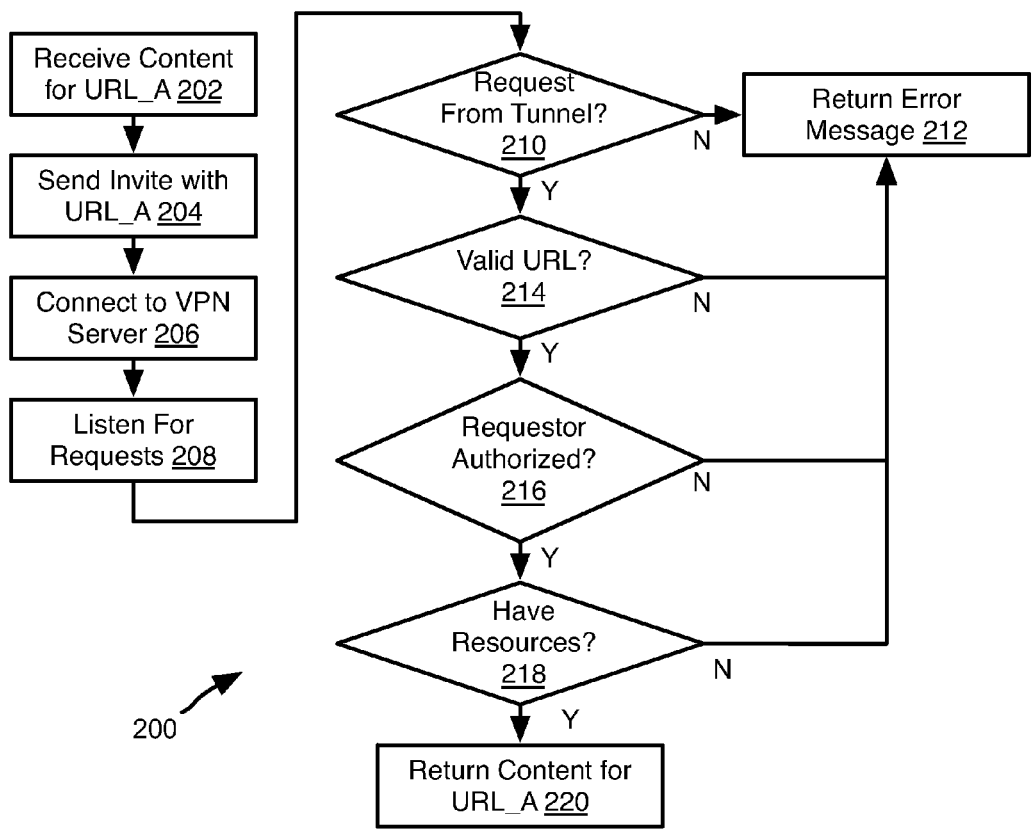
FIG. 2 is a process flow diagram of a method for sharing content from a provider's personal computer in accordance with an embodiment of the present invention.

FIG. 2 illustrates a method 200 that may be performed using the environment 100 of FIG. 1. In particular, the illustrated method 200 may be executed on the provider computer 102, such as by the personal server 118 executing on the provider computer 102.

The method 200 may include receiving 202 content, e.g. a designation of content, to be shared. The content may be any file, such as an audio, video, image, or text file. Receiving 202 the designation of content may include receiving designation of a file on the provider computer 102, network storage 112, video from the security camera 110, or some other source. Receiving 202 the designation of content may include receiving a file name or the actual content of the file, for example a full path or URL pointing to the file.

The method 202 may further include sending 204 an invitation to access the content with a URL, URL_A in the illustrated example. In particular, the personal server 118 may assign URL_A to correspond to the content received at step 202 in response to receiving 202 the instruction to share the content.

The method 202 may further include connecting 206 the provider computer 102 to the VPN server 104, such as by the VPN client 120. The step of connecting 206 the provider computer 102 may be performed prior to and/or independent of the receiving 202 of content and sending 204 of the invite. For example, the provider computer 102 may maintain a connection to the VPN server 104 while the provider computer 102 is on and connected to a network, e.g. the Internet.

The method 202 may include listening 208 for requests for content. For example, the personal server 118 may listen for requests referencing URLs associated with shared content. In response to receiving a request for content, the personal server 118 may evaluate whether a response to the request is appropriate. A request for content may include, for example, a URL associated with that content, such as the URL_A assigned to content received at step 202. Various content items may be shared and each may have a unique URL assigned thereto and which may be include in a request for content received.

The method 200 may include determining 210 whether the request was received through the VPN tunnel. If not, an error message may be returned 212 to the requestor, e.g. a source IP address included in the request, and no content is returned in response to the request.

If so, the method 200 may include evaluating 214 whether the request includes a valid URL. If not, then a corresponding error message is returned 212 and no content is returned in response to the request. If so, then the method 200 may include evaluating 216 whether the requestor is authorized. For example, step 216 may include evaluating some or all of a source IP address, username, password, or other authenticating or identifying information included in the request and comparing this information to information for invitees to whom invitations have been sent 204. If the requestor is not found 216 to correspond to an invitee that has been sent 204 an invitation or is otherwise not authorized, the method 200 may include returning 212 an error message without returning content requested by the request. If the requestor is found 216 to be authorized, the method 200 may include evaluating 218 whether the provider computer 102 has sufficient resources to respond to the request. For example, resources evaluated may include CPU usage, bandwidth, a number of other requests currently being responded to, or the like. If resources required to respond to the request in view of current usage would exceed the capacity of the provider computer 102, an error message may be returned without returning the content requested by the request.

The evaluation of the conditions in steps 210-218 may be performed in any order and one or more of the steps 210-218 may be omitted in some embodiments. If all of the conditions evaluated in the particular embodiment are found to be met, then the content requested by the request is returned 220 to the requestor. In particular, the content references by the request may be identified according to a mapping of a URL included in the request and the content. For example, the mapping between URL_A and the content received at step 202 in the illustrated example. Returning of content may be performed through the VPN tunnel such that the VPN server 104 forwards the requested content to the requestor by way of the protocol conversion proxy 116 as discussed above.

Figure 3:
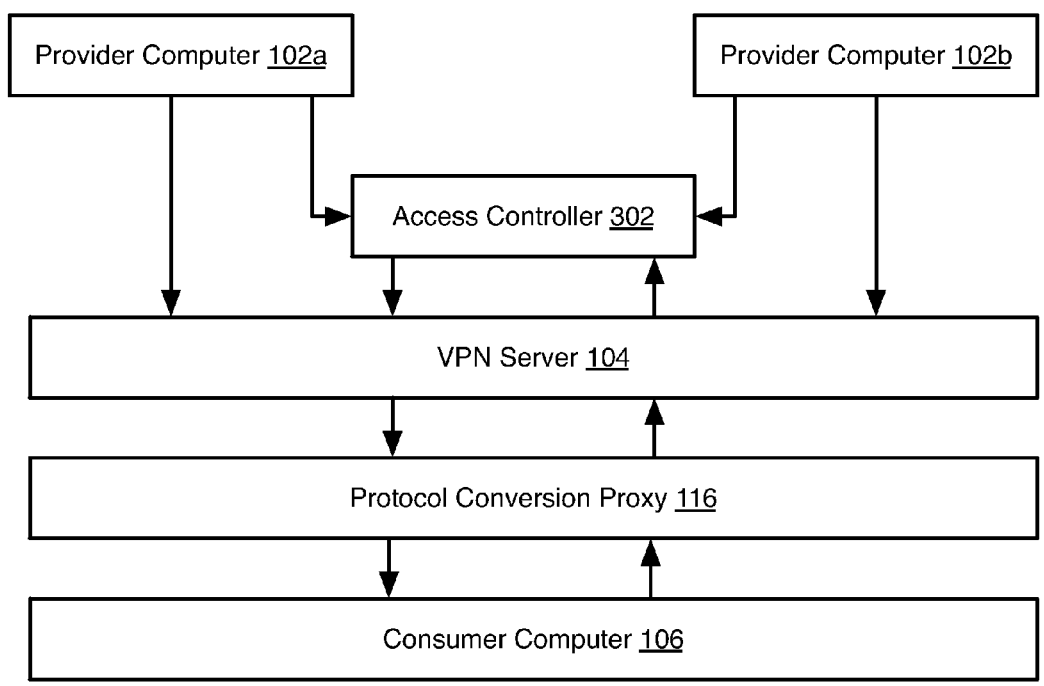
FIG. 3 is a diagram of a second network environment for sharing content including a protocol conversion proxy in accordance with an embodiment of the present invention.

FIG. 3 is a block diagram of an implementation 300 where multiple provider computers 102a, 102b are connected to the same connection server, e.g. VPN server 104. Each provider computer 102a, 102b reports its identifier (e.g., dev_id1, dev_id2), references to available content (e.g., URL1, URL2) to a module accessible by the VPN server, herein referred to as the access controller 302. Upon receiving a URL request from a protocol conversion proxy 116, VPN server 104 obtains the rules and identifiers associated with this request, e.g. the URL included in the request. For example, rules may be defined in response to received URLs from a particular device. For example, upon receiving URL_A from computer 102a having identifier dev_id1, a rule may be created that indicates that URL_A is mapped to dev_id1.

Upon receiving a request, the VPN server 104 applies the rules, and routes the request to the provider computer 102a, 102b in response to determining the provider computer 102a, 102b to correspond to the identifier mapped to the URL included in the request. In the illustrated example, provider computers 102a, 102b announce their content to the access controller 302 (e.g. URL1 and URL2, respectively) and the VPN server 104 stores a mapping between provider computers 102a, 102b and the URLs submitted thereby. Subsequently, a request for URL1 may be received. The VPN server 104 then connects the request to provider computer 102a in response to determining that the stored mapping maps provider computer 102a to URL1. In other examples, multiple content requests could be processed at the same time period and be routed to multiple provider computers through the single VPN server 104 and protocol conversion proxy 116.

In some embodiments, a content request is sent to the provider computer 102a, 102b identified by the request only if one or more preset conditions are met. For example, one or more conditions that are received from the provider computer 102a, 102b referenced by the request before a consumer computer 106 issues the request.

Figure 4:
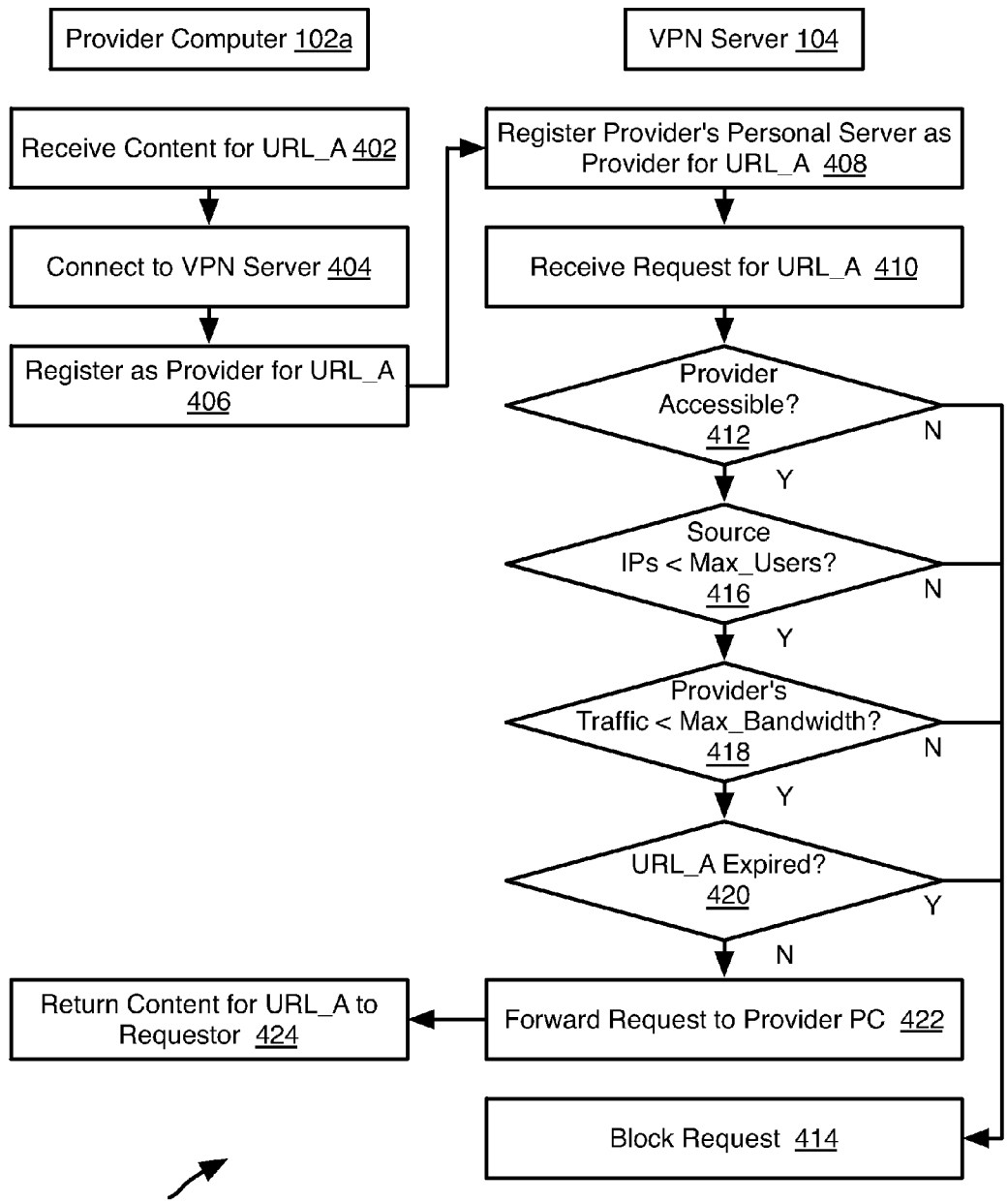
FIG. 4 is a process flow diagram of a method for sharing content using a protocol conversion proxy in accordance with an embodiment of the present invention.

FIG. 4 depicts a method 400 wherein any provider computer of a plurality of provider computers, provider computer 102a in the illustrated example, receives 402 content, e.g. a designation of content as described above, for association with a URL, such as URL_A. The provider computer 102a connects 404 to the VPN server 104 and registers 406 as a provider of content for URL_A. Registering 406 the provider computer 102a as provider of content for URL_A may include transmitting URL_A to VPN server 104 along with one or more access rules for URL_A. The VPN server 104 registers 408 the received URL_A and access rules with a connection identifier of the VPN client 120 of provider computer 102a from which they were received, thereby mapping the personal server 118 of the provider computer 102a to URL_A.

Subsequent to registering 408 URL_A, the VPN server 104 may receive 410 a request for URL_A. In the illustrated embodiment, VPN server 104 then retrieves access rules registered 408 for URL_A and applies these access rules. The illustrated steps 412-420 illustrate examples of access rules that may be applied. For example, the received 410 request may be forwarded 422 to the provider computer 102a registered for URL_A only if the provider computer 102a is found 412 to be accessible, the number of source IP addresses currently accessing provider computer 102a is found 416 to be less than a maximum number of users (Max_Users), the traffic being output by provider computer 102a is found 418 to be less than a maximum bandwidth (Max_Bandwidth), and the URL_A of the request is not found 420 to have been expired. The values of Max_Users, Max_Bandwidth, and the expiry period for the URL_A that are evaluated at steps 416-420 may be specified in the access rules received from the provider computer 102a when registering URL_A. If the conditions evaluated at steps 412, 416, 418, and 420 are not found to have been met, then the request is blocked 414 and is not forwarded to the provider computer 102a. In some embodiments, access rules could be stored and/or applied by another module accessible from the VPN server 104, such as the access controller 302 of FIG. 3.

Upon receiving a forwarded request, the provider computer 102a, such as using the personal server 118, responds to the request, such as by retrieving the content designated at step 402 as being associated with URL_A and returning it to the source IP address included in the request. Returning the content may include transmitting the requested content over the VPN tunnel between the provider computer 102a and the VPN server 104.

The access rules described with respect to FIG. 4 advantageously protect the provider computer 102a from attacks common to content servers (e.g., denial of service, port scans, unauthorized consumers, etc.), as long as it only accepts content requests through the encrypted reverse connection to the VPN server 104.

Figure 5:
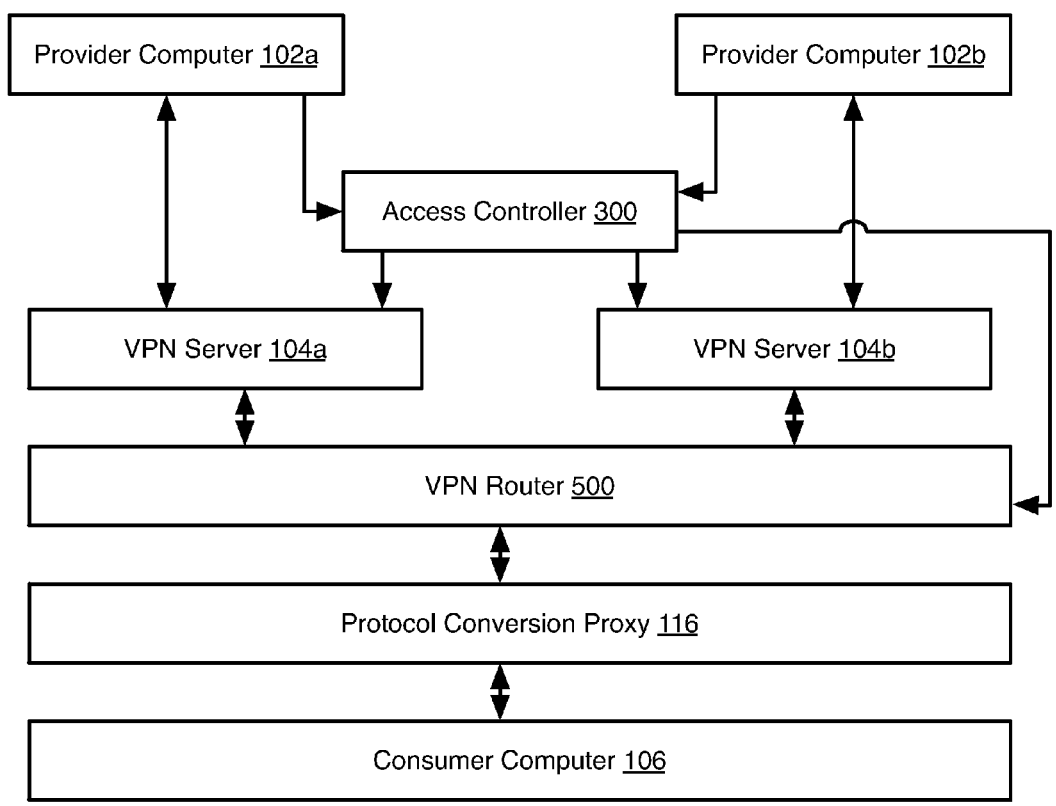
FIG. 5 is a diagram of a third network environment including both a protocol conversion proxy and VPN router in accordance with an embodiment of the present invention.

FIG. 5 is a block diagram of an implementation 500 where multiple provider computers 102a, 102b are connected to different connection servers, e.g. VPN servers 104a, 104b, while the consumer computer 106 is provided with URL1 pointing to a single protocol conversion proxy 116. To access provided content through the correct VPN server 104a, 104b, the implementation 500 may include a VPN router 500, enabled to route content requests to their providers based on URLs included in the requests and access rules associated with each URL. After each provider computer 102a, 102b connects to a VPN server 104a, 104b, each VPN server 104a, 104b sends identifiers of the provider computers 102a, 102b connected thereto to the VPN router 500, together with an identifier of the each VPN server 104a, 104b. As previously described in relation to FIG. 3, each provider computer 102a, 102b registers with access controller 300 its own identifier and URLs of the content it can serve as well as access rules.

Upon receiving a request for URL1 from the protocol conversion proxy 116, VPN router 500 obtains the identifier of the provider computer 102a and access rules that are associated with URL1 from the Access Controller 512 and routes the request through the corresponding VPN server 104a that is associated with the identifier of the provider computer 102a. In this example, VPN router 500 also passes the access rules associated with URL1 to VPN server 104a together with URL. In other implementations, VPN router 500 may check some access rules (for instance, whether URL has expired) and blocking requests that do not meet those access rules that are checked. Those requests that meet the conditions of the access rules that are checked may then be passed to the appropriate VPN server 104a, 140b with those access rules that were not checked (for instance, rules regarding maximal amount of allowed bandwidth as described with respect to FIG. 4). In the illustrated embodiment, VPN servers 104a, 140b may be placed at different geographic locations selected to be close to provider computers 102a, 102b, while protocol conversion proxy 116 and VPN router 500 may be placed in the single location, e.g. the same computer or same local network.

Figure 6:
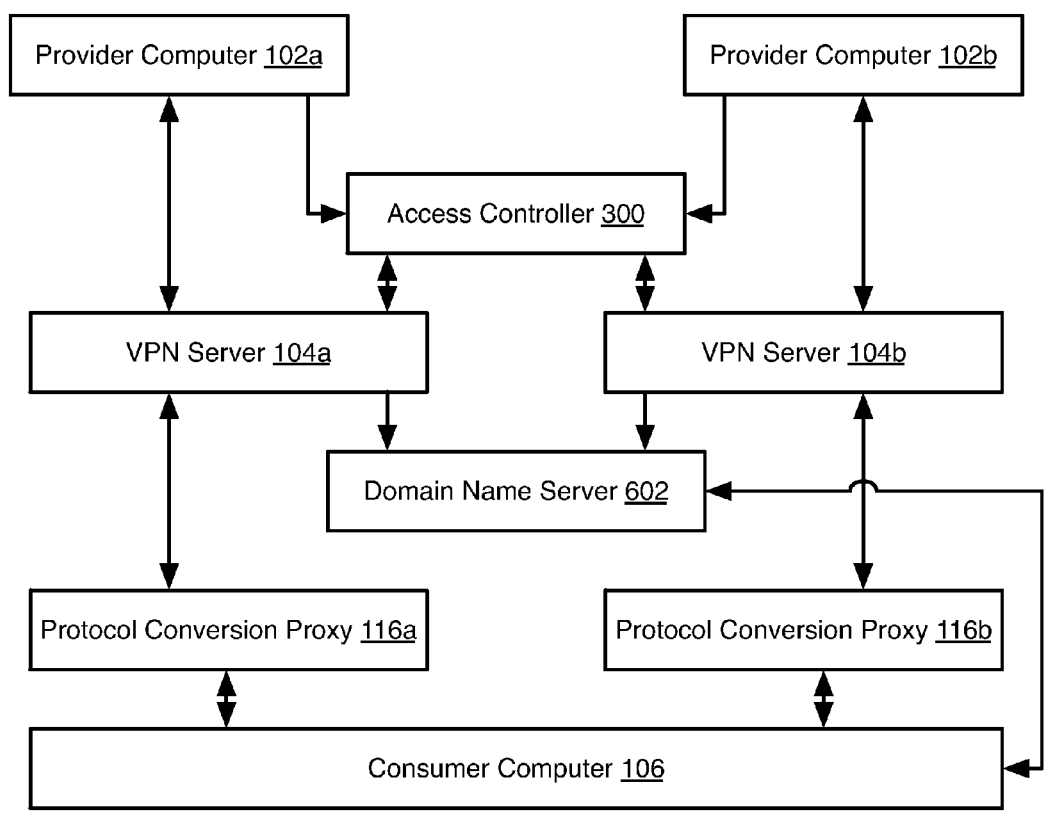
FIG. 6 is a diagram of a fourth network environment including a protocol conversion proxy and domain name server in accordance with an embodiment of the present invention.

FIG. 6 is a block diagram of an implementation 600 where, in addition to connecting VPN clients 120 of various provider computers 102a, 102b to different VPN servers 104a, 104b, content consumers 106 can be connected to different protocol conversion proxies 116a, 116b. Instead of using a single protocol conversion proxy 116 and VPN router 500 to process every content request after it's issued by the consumer, this implementation uses a domain name server 602 to point consumer computer 106 to a protocol conversion proxy 116a, 116b associated with the correct VPN server 104a, 104b, without the need for VPN router 500.

In one instance, protocol conversion proxy 116a, 116b resides on the same local network as the corresponding VPN server 104a, 104b, respectively (for example, in the same colocation). In another instance, both VPN server 104a, 104b and corresponding protocol conversion proxy 116a, 116b are located on the same node of the local network, associated with the same physical computer hardware. These implementations protect HTTP traffic between protocol conversion proxy 116a, 116b and VPN server 104a, 104b from interception, limiting it to a local network or the same computer.

After receiving an HTTPS URL from a provider computer 102a, 102b, in a message as described herein, the consumer computer 106 may issue a DNS (domain name service) request to resolve the HTTPS domain to an IP address. Domain name server 602 is registered as an authoritative name server for the domains used by personal content URLs and therefore processes such requests.

In this implementation, a domain of the content URL announced to the consumer computer 106 (URL1) by provider computer 102a contains a reference to identifier of the connection between the provider computer 102a and VPN server 104a (for instance, dev_id1.maindomain.com). Each protocol conversion proxy 116a, 116b may have access to a private wildcard SSL certificate (for instance, *.maindomain.com), which enables it to function as an HTTPS server for all requests matching this pattern.

After a provider computer 102a, 102b connects to a VPN server 104a, 104b, the VPN server 104a, 104b informs domain name server 602 that the requests including the identifier associated with the connection to provider computer 102a, 102b should be routed through that VPN server 104a, 104b. When the provider computer 102a, 102b disconnects from the VPN server 104a, 104b, VPN server 104a, 104b informs the domain name server 602 that its association of the identifier of the provider computer 102a, 102b to the VPN server 104a, 104b is no longer valid. To minimize delay in propagating these changes, domain name server 602 may set a time to leave (TTL) for its domains, after which the domains will expire and no longer be used to route requests.

After receiving a request for a domain name, domain name server 602 matches it with connection identifiers reported by the VPN server 104a, 104b. If a match is found, the domain name server 602 responds with an IP address corresponding to the protocol conversion proxy 116a, 116b associated with that VPN server that reported the matching connection identifier. The consumer computer 106 receives the IP address of the appropriate protocol conversion proxy 116a, 116b and sends a request for URL1 to that protocol conversion proxy 116a, 116b. Upon receiving the request the announced HTTPS URL (URL1), the protocol conversion proxy 116a, 116b passes the converted HTTP request to a corresponding VPN server 104a, 104b associated with URL1.

In another aspect described below with respect to FIGS. 7-9, a provider computer 102a, 102b establishes a connection with a connection server, e.g. VPN server 104a, 104b, enabled to provide reverse connections. A consumer computer 106 issues a request for content available on a server computer and receives a response containing reference to the content provided by the provider computer 102a, 102b and then requests this content through a reverse connection to the provider computer 102a, 102b, where the data exchange between the first and the second computers is encrypted using the keys known to the provider computer 102a, 102b and the consumer computer 106.

Figure 7:
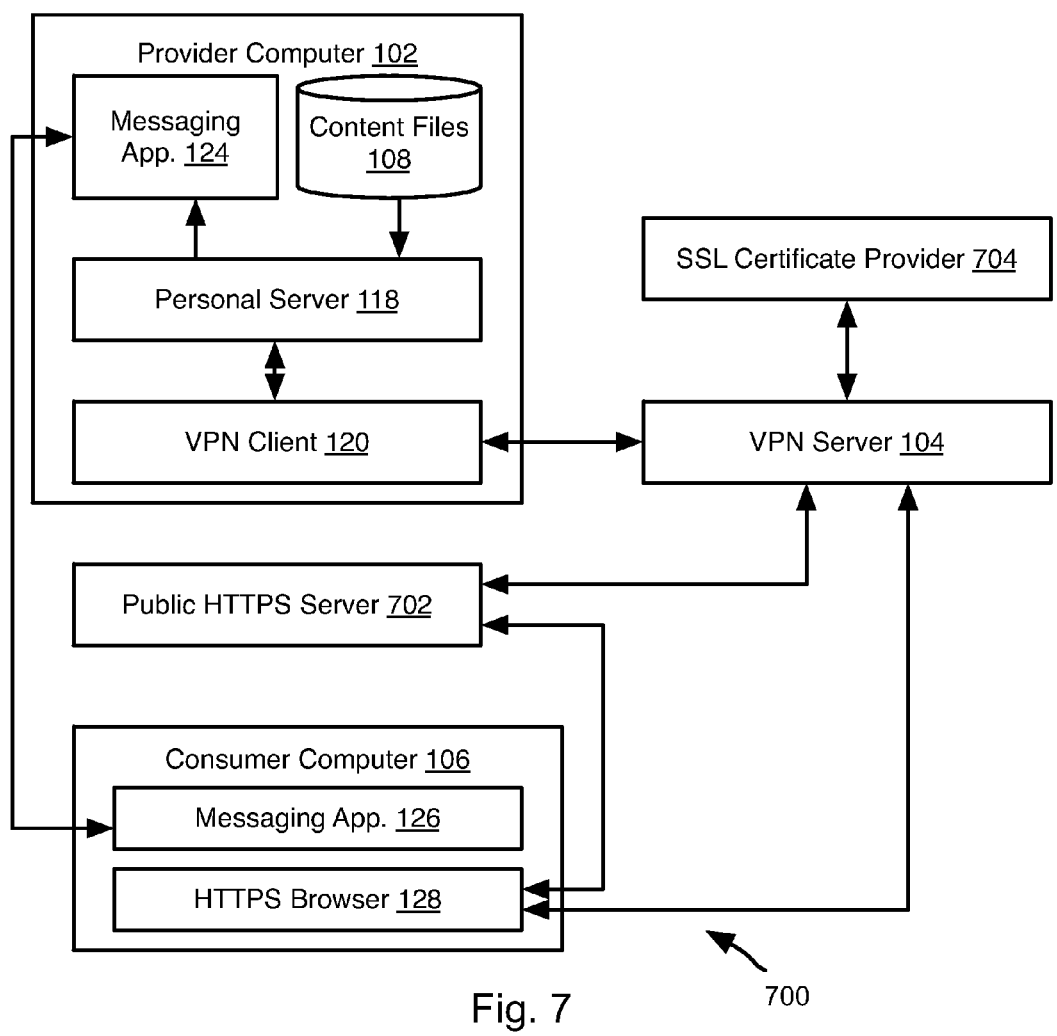
FIG. 7 is a diagram of a fifth network environment for providing secure HTTPS connections between provider and consumer computers in accordance with an embodiment of the present invention.

For example, referring to FIG. 7, consumer computer 106 may issue a request for content associated with URL_B from the provider computer 102. This request passes though reverse connection between VPN server 104 and the VPN client of provider computer 102 and reaches the personal server 118 of the provider computer 102. This reverse connection allows content request from the consumer computer 106 to reach the provider computer 102, even if external access to the provider computer 102 is blocked by a NAT or a firewall. In the illustrated embodiment, the VPN server 104 is capable of establishing reverse connections (for instance, OpenVPN Server provided by the OpenVPN Technologies Inc.). In other implementations, the VPN server 104 may be replaced by a connection server that is a proxy or an application-level tunnel server (such as SSH server) capable of providing reverse connection.

In the embodiment of FIG. 7, data exchange between computers 102, 106 is encrypted by HTTPS protocol. The request from the provider computer 106 is issued by HTTPS browser 128 on the consumer computer 106 and processed by the personal server 118, which may be embodied as an HTTPS server, on the provider computer 102. The personal server 118 may have access to the private SSL certificate required to establish HTTPS connection for domain_B, used by URL_B. Data exchange between provider and consumer computers 102, 106 of the content is encrypted end-to-end, remaining opaque to the intermediate modules such as VPN server 104.

Data exchange between provider computer 102 and consumer computer 106 could be protected by different encryption protocols, for instance, a VPN protocol such as IPSEC or L2TP. In such implementations, consumer computer 106 may host a VPN client, while provider computer 102 has a VPN server, providing end-to-end encryption between provider computer 102 and consumer computer 106 of the content. In this case, a VPN tunnel between consumer and provider computers 102, 106 may be further encapsulated by a VPN tunnel between provider computer 102 and VPN server 104, and proceeds without additional encapsulation from VPN server 104 to consumer computer 106. In another implementation, consumer and provider may have different nodes of the messaging application 124, 126 that encrypts communications between clients using public/private key encryption or some other encryption means.

In such implementations, personal server 118 may be required to have access to an encryption key to establish end-to-end encryption with consumer computer 106. In the case of HTTPS protocol, the personal HTTPS server 702 may be required to have access to a private SSL certificate that authenticates that server 702 as provider of the content associated with a specific domain (domain_B for HTTPS URL_B, for example). In the depicted embodiment, VPN server 104 obtains private SSL certificate from the SSL certificate provider 704 and then sends it to the provider computer 102 through the VPN client 120. In another embodiments provider computer 102 may obtain private SSL certificate from provider 704 in bypass of the VPN server 104, for instance, by establishing direct secure connection with provider 704, thereby hiding private SSL certificate from observation. For other encryption protocols, the personal server 118 may need access to other types of private encryption keys. Because a personal computer, such as the provider computer 102, is less protected from unauthorized access than a server in a dedicated location, it increases the risk that such private certificate or a private key could be obtained by unauthorized third party. Such a third party could snoop on the data exchange (e.g., by making itself a man-in-the-middle), or become an impostor (announce availability of the content from unauthorized server).

In the aspect depicted on FIG. 1, this problem was addressed by using protocol conversion proxy 116 to terminate SSL connection before it reached the provider computer 102. However, it made HTTP traffic between the protocol conversion proxy 116 and personal server 118 open to observation by modules processing that traffic, such as protocol conversion proxy 116 and connection server, e.g. VPN server 104.

In the aspect depicted on FIG. 7, which prevents the traffic between provider and consumer from interception, increased security risk of making sensitive certificate or a key available on the personal computer is mitigated by the ability to easily replace the compromised certificate or a key without the need to invalidate content links provided to consumers.

In the depicted embodiment, consumer computer 106 issues content request for URL_A, served by a publicly accessible HTTPS server 702. The SSL certificate accessible by that server 702 is considered safe, because server can be placed in a secure location.

In the depicted embodiment, consumer computer 106 obtains URL_A from provider computer 102, which transmits URL_A by sending a message from one messaging application 124 to the messaging application 126 executing on the consumer computer 106. For example, URL_A could be sent via instant messaging, email, or posted to a known web site in the same manner discussed above with respect to step 204 of the method 200 of FIG. 2.

In one implementation, provider computer 102 sends a message to consumer computer 106 with a reference to the content available from a public HTTPS server in bypass of the VPN server 104, hiding at least the path and query portions of the URL_A from observation.

In response to a request for URL_A, public server 702 returns URL_B that references the content stored on provider computer 102, Such URL could be returned, for instance, as a source of IFrame, an image or a video embedded into HTML content, or as a redirection. It may be done immediately, or after few intermediate steps (for instance, chain of redirects, or nested IFrames).

Public server only needs to know which URL_B to return in response to request for URL_A; in one implementation, it can generate URL_A containing a reference to a URL_B and then send it to the content provider for distribution to the consumer. For instance, such URL may take a form "www-.domain_A.com/index", where index is a reference to URL_B provided by the personal server 118.

In one instance, communications between provider computer 102 and server 702 a protected from interception by HTTPS encryption, or issued in bypass of server 104.

If domain_B certificate stored on a provider computer 102 is compromised, URL_B could easily be replaced with the one using a different SSL certificate, without changing the link to URL_A known to the consumer.

In the depicted embodiment, after determining that domain_B could be compromised (for instance, by detecting malware traffic from the provider computer 102 through VPN tunnel), VPN server 104 selects new domain_B, obtains new SSL certificate for that domain from SSL certificate provider 704 and then passes new domain_B and new SSL certificate to the personal HTTPS server 118. In another instance, provider computer 102 may select new domain_B by itself and receive the updated certificate from the SSL certificate provider without making it known to a VPN server. In one other instance, provider computer 102 could be considered "high security risk" and denied the ability to serve its content, instead of providing the new SSL certificate.

In another embodiment, different communication protocols are used to obtain content announced by the provider than to obtain content from the personal server. In one instance, request for HTTPS URL_A, sent to the public server 702, may return updated host name of the Personal VPN server (for instance, IPSEC server) on provider computer 102. If such host name should be replaced, URL_A will return its replacement and may notify the consumer that settings of the local VPN client should be updated. In another instance, request for URL_A could use HTTP protocol (for instance, only to return a redirect to HTTPS URL_B), while request for URL_B could use HTTPS protocol to protect sensitive content.

In one implementation, servers that return public content and personal content may be located on the same personal computer. For example, content referenced by the URL_A may be served by a HTTP server on provider computer 102 and content served by URL_B is served by a personal HTTPS server also executing on provider computer 102.

The embodiment of FIG. 7 advantageously improves detection of compromised domains associated with personal content. In this aspect, consumer computer 106 requests content from public HTTPS server 702 and receives a response containing a reference to a content available from the provider computer 102. The consumer computer 106 establishes an encrypted connection to the provider computer 102 and requests a content over this connection. The source IP addresses of the requests to the public HTTPS server 702 and provider computer 102 are compared. If these IP addresses do not match, it indicates an increased risk that one of the encrypted connections established by the consumer computer 106 to these IP addresses is compromised.

In one implementation, the connection between the consumer computer 106 and public HTTPS server 702 uses different encryption keys than the connection between the consumer computer 106 and provider computer 102. When one of the two encrypted communication channels established by the consumer computer 106 has lower risk of compromising its encryption that another channel, detection that source IP addresses of the two requests don't match increases the probability that the encrypted channel with the higher security risk is compromised.

In one instance, the provider computer 102 establishes a connection with a connection server, e.g. VPN server 104, enabled to provide reverse connection, and a content request from the consumer computer 106 to the provider computer 102 is sent through this connection server, while the content request from the consumer computer 106 to the public HTTPS server 702 is sent in bypass of this connection server. In this instance, the encrypted connection between the consumer computer 106 and the provider computer 102 has higher risk of interception if provider computer 102 is a personal computer, storing its private encryption keys in the less secure location than the public HTTPS server 702.

Referring to FIG. 7, the server 702 reports the source IP of consumer computer 106 used to request URL_A to VPN server 104, which compares it with a source IP of request for URL_B. If the source IPs are different, it increases the risk that an unauthorized third party has obtained the private SSL certificate for domain_B corresponding to HTTPS URL_B, changed the DNS response (for instance, through DNS cache poisoning) to point domain_B to its own server, and performed a "man-in-the-middle" attack, i.e. created two separate HTTPS connections with provider computer 102 and consumer computer 106 instead of one HTTPS connection between consumer and provider computers 106, 102, thereby gaining an ability to intercept and modify their HTTPS traffic.

This implementation helps to detect interference from the third party server that has a different public IP address than consumer computer 106.

In one implementation, the risk that the encrypted connection between the consumer and provider computers 106, 102 is increased if the request for the content referenced in the response from the public HTTPS server 702 does not arrive within a pre-defined time interval, for instance having a value smaller than 10 seconds, or some other time period. If time between requests from the same IP address exceeds that interval, it may indicate additional time used to intercept the traffic, for instance by routing it though the data channels under third party control. If the request for the content referenced in the response from the public HTTPS server 702 does not arrive at all, it may indicate an impostor, pretending to be a content provider but responding with its own content. This implementation helps to identify interference from the third party even if source IP address doesn't change (for instance, if third party uses deep packet inspection, decoding the observed packets with a compromised SSL certificate).

Figure 8A:
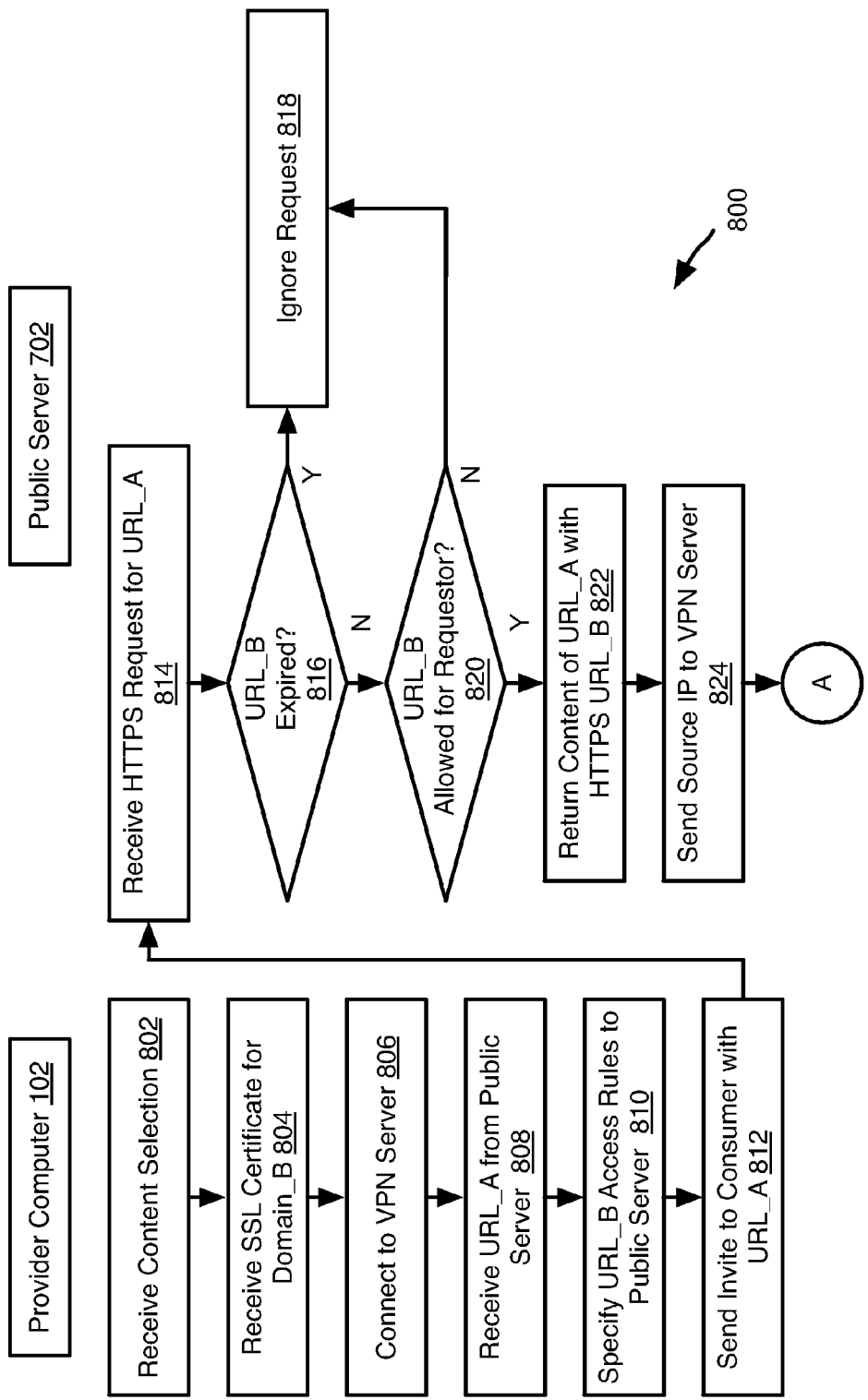
FIGS. 8A and 8B illustrate a process flow diagram of a method for providing secure HTTPS connections between provider and consumer computers in accordance with an embodiment of the present invention.
Figure 8B:
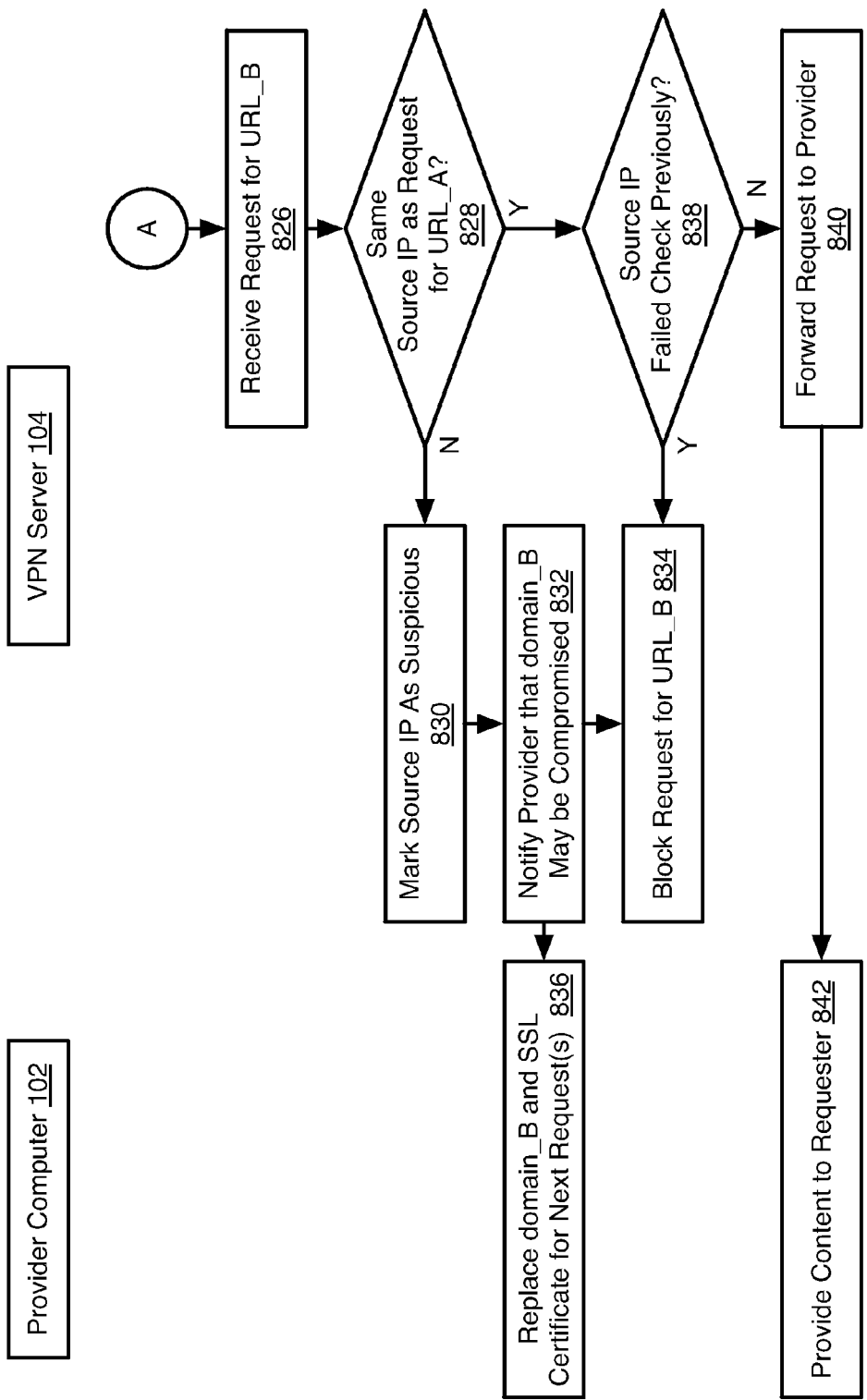

FIGS. 8A and 8B illustrates a method 800 such as may be used for the implementation of FIG. 7, where both the server that receives the first content request (public server 702) and the server that receives the second content request (VPN server 104) perform the checks that protect provider computer 102 from invalid or compromised requests.

The method 800 may include receiving 802, on the provider computer 102, a selection of content to be shared, such as in the same manner as for other methods described herein. The provider computer 102 may receive 804 a security certificate, such as a secure socket layer (SSL) certificate. For example, the provider computer 102 may request an SSL certificate for domain_B corresponding to URL_B from a SSL certificate provider 704 (see FIG. 7) and receive the requested SSL certificate.

The provider computer 102 may further connect 806 to the VPN server 104. The provider computer 102 may be connected 806 to the VPN server 104 prior to steps 802, 804. For example, the provider computer 102 may request and receive 804 the SSL certificate through the VPN server 104.

The method 800 may include receiving 808 URL_A from the public server 702. For example, the provider computer 102 may request a unique URL in order to associate it with the content identified at step 802. In response, the public server 702 may return URL_A, which is then received 808 by the provider computer 102 and associated with the content received at step 802 to URL_A.

The provider computer 102 may then specify 810 to the public server 702 that URL_B is associated with URL_A. The provider computer 102 may further specify access rules for URL_A and URL_B. The provider computer 102 may further send 812 an invitation including URL_A to one or more consumer computers 106, such as using any of the messaging applications described above.

The public server 702 may receive 814 a request for URL_A, such as from the consumer computer 106 that received the invitation sent at step 812. The public server 702 may then apply one or more access rules according to steps 816-820 as received at step 808 or set as default access rules.

For example, if URL_B associated with URL_A is found 816 to have expired, then the request for URL_A may be ignored. In particular, URL_B may expire after some period after the certificate for domain_B is generated. URL_B may also expire after having been returned to requestors some set number of times. Accordingly, if one or more of these expiration conditions are met, the request is ignored 818 by the public server 702 such that URL_B is not returned in response to the request including URL_A.

The public server 702 may further evaluate 820 whether URL_B may be accessed by the requestor. For example, the access rules for URL_B may specify an identifier, password, source IP address, or other identifying information for one or more requestors that are authorized to receive URL_B in response to a request for URL_A. Accordingly, if the request is not found 820 to include such an identifier for an authorized requestor, the request may be ignored 818.

In some embodiments, if a request is ignored 818 for failing to meet one or more access rules, a response may nonetheless be returned to a requestor in response to a request for URL_A. For example, content associated with URL_A by the public server 702 may be returned to the requestor but not include URL_B.

In some embodiments, the public server 702 may replace the link to URL_B in a response to the request with a message that would inform the consumer that the content associated with URL_B is not available.

In some embodiments, if the request is ignored 818, the public server 702 may include in a response to the requestor interface elements that would allow consumer to access provider's content—for example, provide authorization credentials, or send provider computer 102 a message requesting to increase maximal access count for requested content.

In another embodiment, if the public server 702 determines that a request should be ignored 818, it returns content referred by the announced URL (URL_A) with a link to provider's content (URL_B), but hides provider's content from observation by the consumer. For instance, the public server may set a visibility attribute of an HTML IFrame loaded from URL_B to the value "hidden." In this embodiment, VPN server 104 is informed about the source IP of the request received at step 814 and can compare it with the source IP of a second request for URL_B, but the requestor will not be able to view the requested content.

In another embodiment, the public server 702 may change the link to provider's content (e.g. URL_B) in a response to a request to URL_A to another link accessible from the same domain, letting the requestor know that returned content will not be displayed. For instance, public server may return URL_B="https://mydomain.com/image20.jpg" for the content that should be displayed, or URL_B="https://mydomain.com/empty.jpg?file=image20.jpg & count=3 &action=hide" for the content that should be hidden (requesting an empty image while informing personal server that the count for the requested file exceeded pre-defined threshold and public server will hide the data from consumer.

If the request is found 816, 820 to satisfy the one or more access rules, then the method 800 may include returning 822 content associated with URL_A by the public server 702 to the requestor. In particular, the content for URL_A may include URL_B. The public server 702 may further send 824 a message to the VPN server 104 indicating that a request for URL_B was received from the requestor, the message including the source IP address of the requestor and possibly other identifying information. In some embodiments, if the public server 702 does not return URL_B to the requestor in response to a request, the public server 702 does not inform the VPN server 104 or other modules of the request.

Continuing to FIG. 8B, the method 800 may continue with the VPN server 104 receiving a request for URL_B addressed to provider computer 102. In response to receiving this request, the VPN server 104 evaluates 828 if the source IP of the request for URL_B is the same that was used for the request for URL_A received at step 814. If the source IPs are found to not match, the VPN server may mark 830 at least one of them as suspicious, treating any requests from that source IP as indications of compromised security. If checks performed by the VPN server 104 indicate that security risk is increased above pre-defined threshold, the VPN server 104 may notify 832 the provider computer 102 assigned URL_B that domain_B may be compromised and block 834 the request for URL_B from reaching provider computer 102. In response to the notification of step 832, the provider computer may replace domain_B and its SSL certificate with another domain and certificate. In particular, the new domain and certificate may be mapped to the original announced URL (URL_A), the public server 702 may be informed of the mapping and one or more access rules in the same manner as for URL_B. In this manner, consumer computers 106 may still access the content associated with URL_A using URL_A notwithstanding the new mapping.

In some embodiments, determining 828 that the source IP addresses do not match will mark one or both of the source IP address as suspicious for a pre-defined time. In some embodiments, security risk may be accumulated over time. For example, upon each determining 828 that source IP addresses do not match for the requests for URL_A and URL_B, the security risk of URL_B may be incremented. Upon the security risk exceeding a threshold condition, URL_B may be deemed compromised and steps 830-836 may be performed.

In some embodiments, a security risk that the encrypted connection with the provider computer 102 is compromised is increased by a larger amount if the same first source IP is included in two or more request for URL_B after being notified by public server 702 of two or more source IPs in requests for URL_A that are different from one another.

If the source IPs are found 828 to match and the source IP of the request received at step 826 is found 838 not to have previously failed the check at step 828, then the request is forwarded 840 to the provider computer 102. The provider computer then establishes an encrypted HTTPS connection to the requestor and provides 842 the content associated with URL_B to the requestor over the encrypted connection. If the source IP of the request received at step 826 is found 838 to have previously failed the check at step 828, the request may be blocked 834.

The system of FIG. 7 and the method of FIGS. 8A and 8B provide for improved detection of compromised domains associated with personal content by comparing source IPs for different requested domains. The systems and methods of FIGS. 7, 8A and 8B may be implemented without establishing end-to-end encrypted communication channel between the consumer computer 106 and provider computer 102, i.e. the comparing of the source IP addresses may detect unauthorized activity even without an encrypted connection between computers 102, 106.

Figure 9:
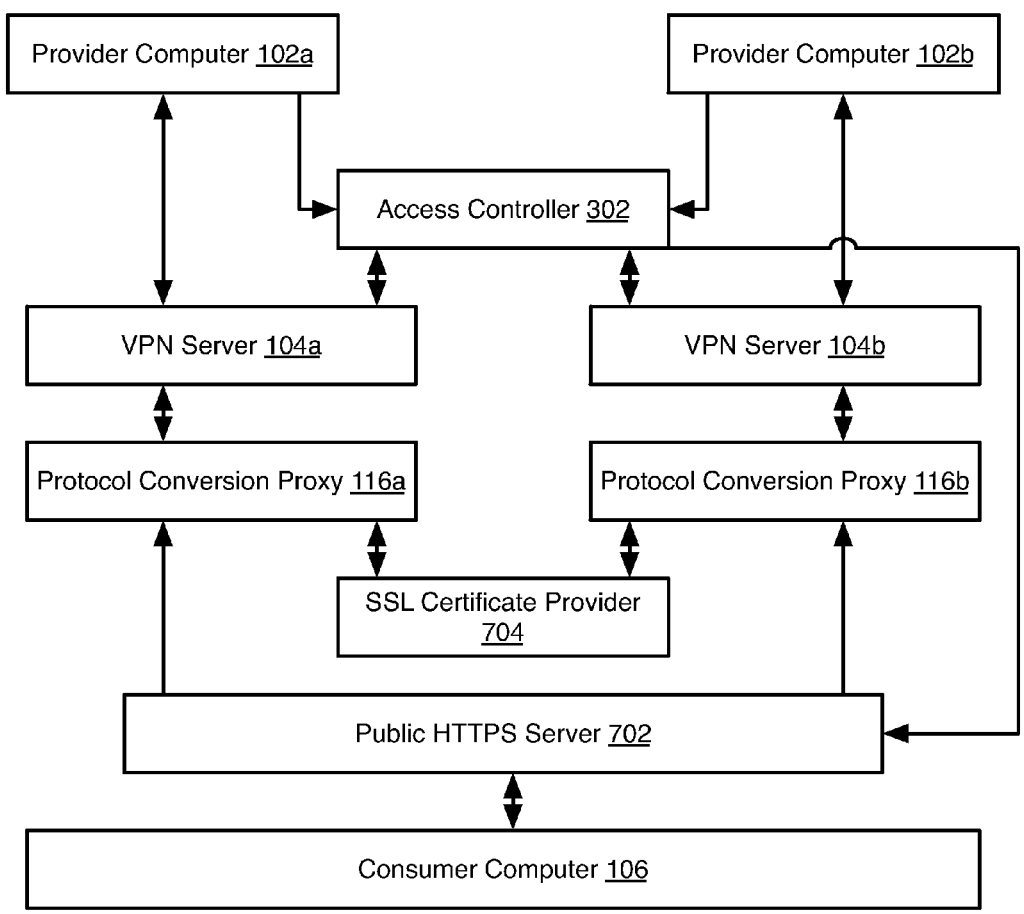
FIG. 9 is a diagram of sixth network environment providing secure HTTPS connections between provider and consumer computers in accordance with an embodiment of the present invention.

FIG. 9 depict an embodiment in which HTTPS requests for the personal content from plurality of provider computers 102a, 102b are sent to plurality of protocol conversion proxies 116a, 116b, which convert them into HTTP requests and forward them to the content providers through reverse connections established by VPN servers 104a, 104b. In this example, each provider computer 102a, 102b uses different domains (for example, domain_B1, domain_B2 for provider computer 102a, 102b, respectively). Each protocol conversion proxy 116a, 116b obtains SSL certificates for the corresponding domains from the SSL certificate provider 704 (in other instance, previously obtained certificates may be requested from secure storage).

A provider computer 102a, 102b announces availability of a URL. For example, provider computer 102a may announce content associated with URL_A1 to consumer computer 106, such as by using a messaging applications 124, 126. The content of URL_A may be served by the public HTTPS server 702, which contains references to the content from two different personal content providers (URL_B1, URL_B2 for provider computers 102a, 102b, respectively). Content may be, for instance, two images or IFrames with different source URLs embedded into HTML content. Public server 702 reports the source IP of the consumer computer 106 requesting the announced URL (URL_A, for example) to each protocol conversion proxy that serves domain returned after request to URL_A.

After consumer computer 106 issues requests for URL_B1 and URL_B2, the corresponding conversion proxies 116a, 116b, respectively, compare the source IPs of requests for URL_B1 and URL_B2 with the source IP reported by the public server 702 as being included in requests for URL_A. If the source IPs don't match, or request for the private content doesn't arrive, it increases the risk that the security of corresponding domain (domain_B1 or domain_B2), respectively, is compromised.

If protocol conversion proxy 116a, 116b is located in the colocation owned by an untrusted third party, security of its private SSL certificate could be compromised if the third party doesn't deploy adequate protection measures. In response to increased security risk, protocol conversion proxy 116a, 116b may select a replacement for the compromised domain and ask for another SSL certificate from SSL certificate provider 704. In another instance, a service provider may decide to move protocol conversion proxy 116a, 116b (possibly, together with the corresponding VPN server 104a, 104b) to another colocation, before requesting another private SSL certificate.

In some embodiments, each of the provider computers 102a, 102b specifies access rules for its content. In such embodiments, each set of rules may be split into two parts: private rules, enforced by VPN servers 104a, 104b (for instance, number of simultaneously connected users, or maximal bandwidth), and public rules enforced by a Public HTTPS server 702 (for instance, maximal number of access requests from the same user, or expiration time). Each provider computer 102a, 102b reports the rules to the access controller 302, which forwards them to the appropriate VPN servers 104a, 104b and the Public HTTPS server 702.

In the implementations depicted on FIGS. 8 and 9, public server 702 keeps the history of previous requests to the personal content, such as a count of requests from the same user and time until content expires. This history can be accessed without the knowledge about the details of the personal content. For instance, public server 702 may belong to a third party aggregator, having its own private SSL certificate that is not available to the servers that process personal content (e.g. VPN server 104a, 104b, protocol conversion proxies 116a, 116b, etc.). Even if this certificate is compromised, it will therefore not affect the security of the personal content.

Figure 10:
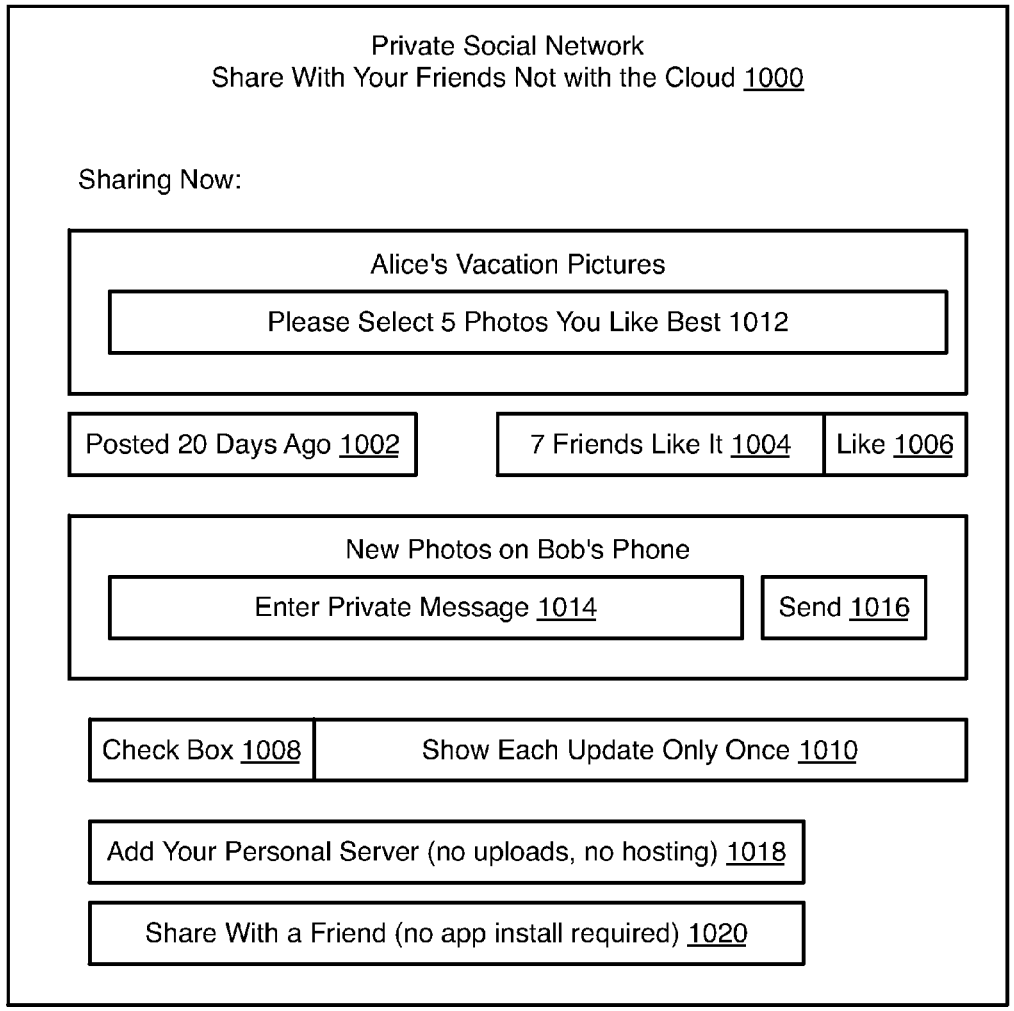
FIG. 10 is a diagram of an example user interface for sharing content in accordance with an embodiment of the present invention.

FIG. 10 depicts an example interface 1000 including the content presented by a third party aggregator, e.g. private social network, on a consumer computer 106, where references to personal content items from different provider computers 102a, 102b are displayed within the parent content provided by the public server 702. In this example, public server 702 decides which content to display, hiding or blocking the content that doesn't satisfy public access rules. In this instance, only allowed content is displayed ("Sharing now"). In another embodiment, public server 702 may include a placeholder for the blocked content ("Please, visit later to see more").

In addition to deciding which content to display, in this example public server 702 may display in the interface 1000 metadata about personal content items and provides interface elements to update this metadata: time since the content was provided 1002, feedback statistics and user interface 1004, 1006, notification that content will be hidden after this view and ability to change this rule 1008, 1010. This metadata is provided by the public server 702 without the knowledge what content is actually displayed by the users. The user of the consumer computer 106 may change or delete it without consent from the third party aggregator.

Personal content providers can collect their own statistics, or communicate with their friends without the knowledge of the public server. For instance, personal content provider can ask for specific user feedback, such as with user interface element 1012 or privately exchange text messages using interface elements 1014, 1016.

In the depicted embodiment, consumers can add their own personal content servers. For instance, after clicking on the button 1018, a new provider of personal content may receive a public URL (URL_A) from the public server, obtain SSL certificate for the domain associated with personal content (domain_B), and provide replaceable URL referencing personal content (URL_B) to the public server 702. Button 1010 may invoke announcement of the public URL referencing the personal content of interest to other consumers, for instance by sending an email, text message, or some other type of message.

Figure 11:
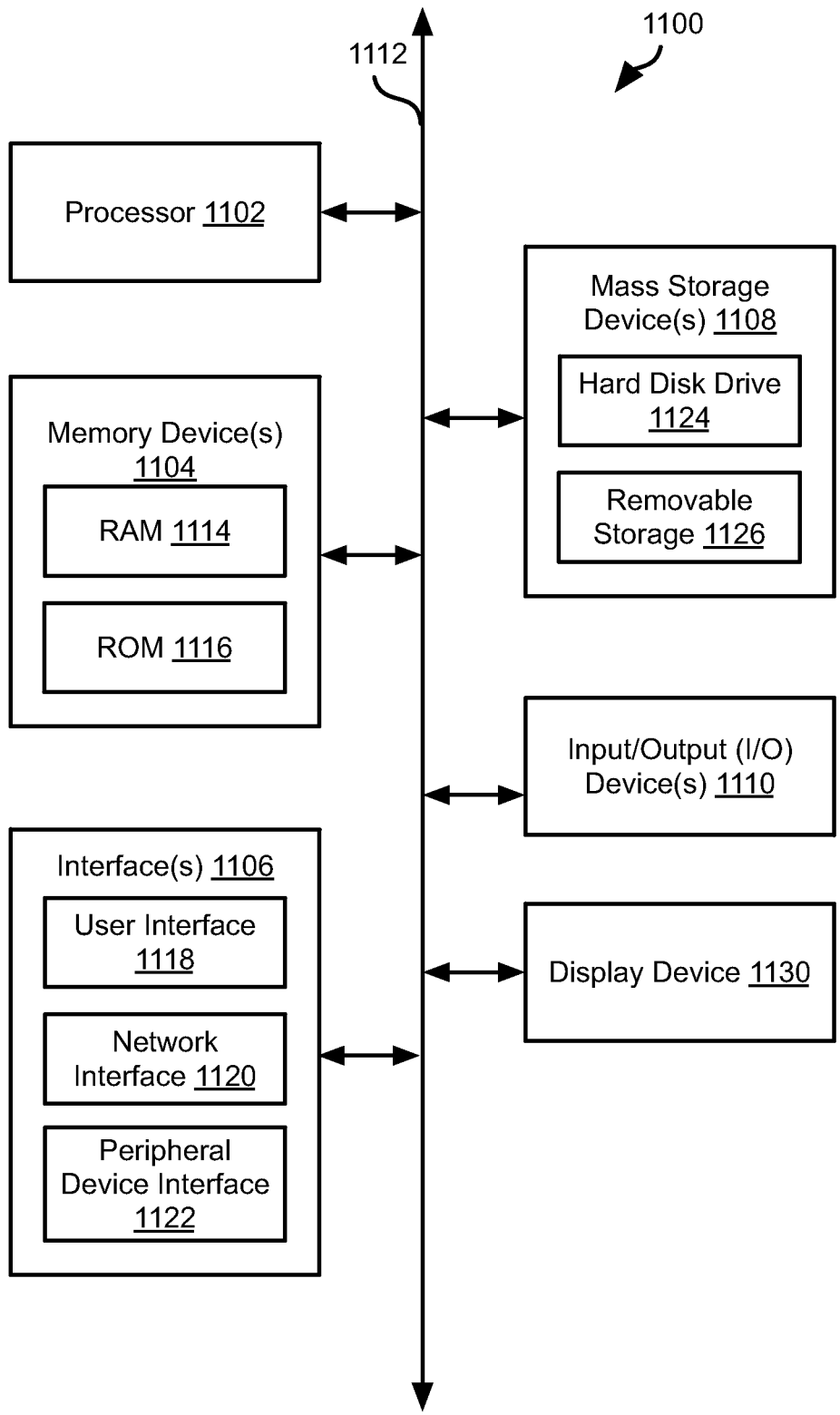
FIG. 11 is a schematic block diagram of a computer system suitable for implementing methods in accordance with embodiments of the present invention.

FIG. 11 is a block diagram illustrating an example computing device 11 which may embody any of the computers and servers disclosed herein. Computing device 1100 may be used to perform various procedures, such as those discussed herein. Computing device 1100 can function as a server, a client, or any other computing entity. Computing device can perform various monitoring functions as discussed herein, and can execute one or more application programs, such as the application programs described herein. Computing device 1100 can be any of a wide variety of computing devices, such as a desktop computer, a notebook computer, a server computer, a handheld computer, tablet computer and the like.

Computing device 1100 includes one or more processor(s) 1102, one or more memory device(s) 1104, one or more interface(s) 1106, one or more mass storage device(s) 1108, one or more Input/Output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed is:

1. A method for providing access to content on a first computer, the method comprising:
    receiving, by a server system, a request from a first computer to establish an encrypted connection comprising a virtual private network (VPN) tunnel according to a VPN protocol;
    establishing, by the server system, the VPN tunnel with the first computer;
    establishing, by the server system, the first connection inside the VPN tunnel such that the server system is enabled to transmit to the first computer over the first connection in a reverse direction within the VPN tunnel, the first connection using a first type of communication protocol, the first type of protocol being less secure than the VPN protocol;
    receiving, by the server system, a request from a second computer to establish a second connection to the server system, the second connection using a second type of communication protocol, the second type of protocol being more secure than the first type of protocol;
    establishing, by the server system, the second connection to the second computer outside of any encrypted transport-level tunnel;
    receiving, by the server system, from the second computer a first request for the content on the first computer, the first request being transmitted over the second connection according to the second type of communication protocol;
    decrypting, by the server system, data from the first request to obtain decrypted data using an encryption key available to the server system; and
    generating, by the server system, a second request containing the decrypted data according to the first type of communication protocol;
    transmitting, by the server system, the second request to the first computer over the first connection within the VPN tunnel according to the first type of communication protocol;
    receiving, by the server system, a first response from the first computer, the first response being received according to the first type of communication protocol over the first connection inside the VPN tunnel;
    converting, by the server system, the first response to a second response, the second response including translated data that is translated from data in the first response by encrypting the data in the first response using the encryption key; and
    transmitting, by the server system, the second response to the second computer according to the second type of communication protocol.

2. The method of claim 1, further comprising transmitting the second request to the first computer only in response to determining that a number of simultaneous connections to the first computer are less than a threshold.

3. The method of claim 1, further comprising:
reporting, by the server system, availability of the content on the first computer to a routing module;
receiving, by the routing module, reports of availability of content on a plurality of different computers from a plurality of intermediary servers;
receiving, by the routing module, the request for the content on the first computer from the second computer; and
routing, by the routing module, the request for the content on the first computer to the server system.

4. The method of claim 3, wherein the server system and routing module are in the same local network.

5. A method for providing access to content on a personal computer, the method comprising:
receiving, by a server system from the personal computer, a posting message, the posting message including a posting uniform resource locator (URL) and referencing content on the personal computer;
receiving, by the server system, a request message from a requesting computer, the request message including the posting URL and having hypertext transport protocol secure (HTTPS) request formatting;
establishing, by the server system, a virtual private network (VPN) tunnel to the personal computer;
decrypting, by the server system, data from the request message using an encryption key to obtain the posting URL;
generating a translated response including the posting URL and having hypertext transport protocol (HTTP) request formatting; and
transmitting, by the server system, the translated message to the personal computer according to HTTP protocol within the VPN tunnel;
receiving, by the server system, a response to the translated message from the personal computer, the response being received according to HTTP protocol through the VPN tunnel and including the content;
encrypting, by the server system, the content using the encryption key to obtain a translated response; and
transmitting, by the server system, the translated response to the requesting computer according to HTTPS protocol.

6. The method of claim 5, further comprising:
reporting, by the server system, the posting URL to a routing module;
receiving, by the routing module from a plurality of intermediary servers, other URLs referencing content on a plurality of other computers;
receiving, by the routing module, the request message; and
routing, by the routing module, the request message to the server system.

7. The method of claim 6, wherein the server system and routing module are in the same local network.

8. A computer-readable medium comprising a non-transitory storage device and storing executable code effective instruct one or more processors to:
receive an instruction to make content available to a recipient computer system;
in response to the instruction to make the content available to a recipient computer system, transmit an invitation to access the content to the recipient computer system;
establish an encrypted virtual private network (VPN) connection to an intermediary server system;
receive one or more requests for the content; and
for each request of the one or more requests—
only if the each request is both of received from the intermediary server and through the encrypted VPN connection, transmitting the content to the intermediary server over the encrypted VPN connection; and
if the each request is not both of received from the intermediary server and through the encrypted VPN connection, refraining from transmitting the content to the intermediary server over the encrypted VPN connection;
wherein the executable code is further effective to instruct the one or more processors to transmit the invitation to access the content to the recipient computer system in bypass of the intermediary server.

9. The computer-readable medium of claim 8, wherein the executable code includes instruction for instructing the one or more processors to transmit the invitation to access the content to the recipient computer system in at least one of a text message, email, message, and posting to a web site.

10. The computer-readable medium of claim 8, wherein the invitation to access the content includes a domain name referencing a computer hosting the processor.

* * * * *